United States Patent [19]

DeMasters et al.

[11] 4,106,580

[45] Aug. 15, 1978

[54] FORCE MEASURING APPARATUS

[75] Inventors: James J. DeMasters, Elmhurst; Victor J. Musante, Garden City, both of N.Y.

[73] Assignee: Brookline Instrument Company, Wallingford, Conn.

[21] Appl. No.: 735,146

[22] Filed: Oct. 26, 1976

[51] Int. Cl.² .............................................. G01G 1/32
[52] U.S. Cl. ..................................... 177/205; 177/212; 177/248
[58] Field of Search .............. 177/252, 248, 246, 212, 177/213, 214, 202, 203, 204, 205, 191

[56] References Cited

U.S. PATENT DOCUMENTS

| 3,055,444 | 9/1962 | Chyo | 177/213 X |
| 3,213,954 | 10/1965 | Meyer | 177/248 |
| 3,561,554 | 2/1971 | Merriam | 177/203 |
| 3,791,467 | 2/1974 | Swersey | 177/157 |

Primary Examiner—Joseph W. Hartary
Attorney, Agent, or Firm—Cooper, Dunham, Clark, Griffin & Moran

[57] ABSTRACT

This force measuring apparatus includes a balance beam, means for applying a force representative of a load to be weighed to the balance beam, and means for applying counterweights in preselected steps to the balance beam. A signal is picked up from the position of the beam and is used to actuate a display indicating the weight of the load. The balance beam moves within a limited range of positions. Whenever it approaches one end of its limited range, a maximum or minimum signal is produced and controls a motor to drive the counterweight means to apply counterweights to the beam or to remove counterweights, as required to restore the balance beam to its limited range of positions. The display is concurrently reset to compensate for the change in the counterweight, so that the display accurately indicates the weight of the load.

11 Claims, 16 Drawing Figures

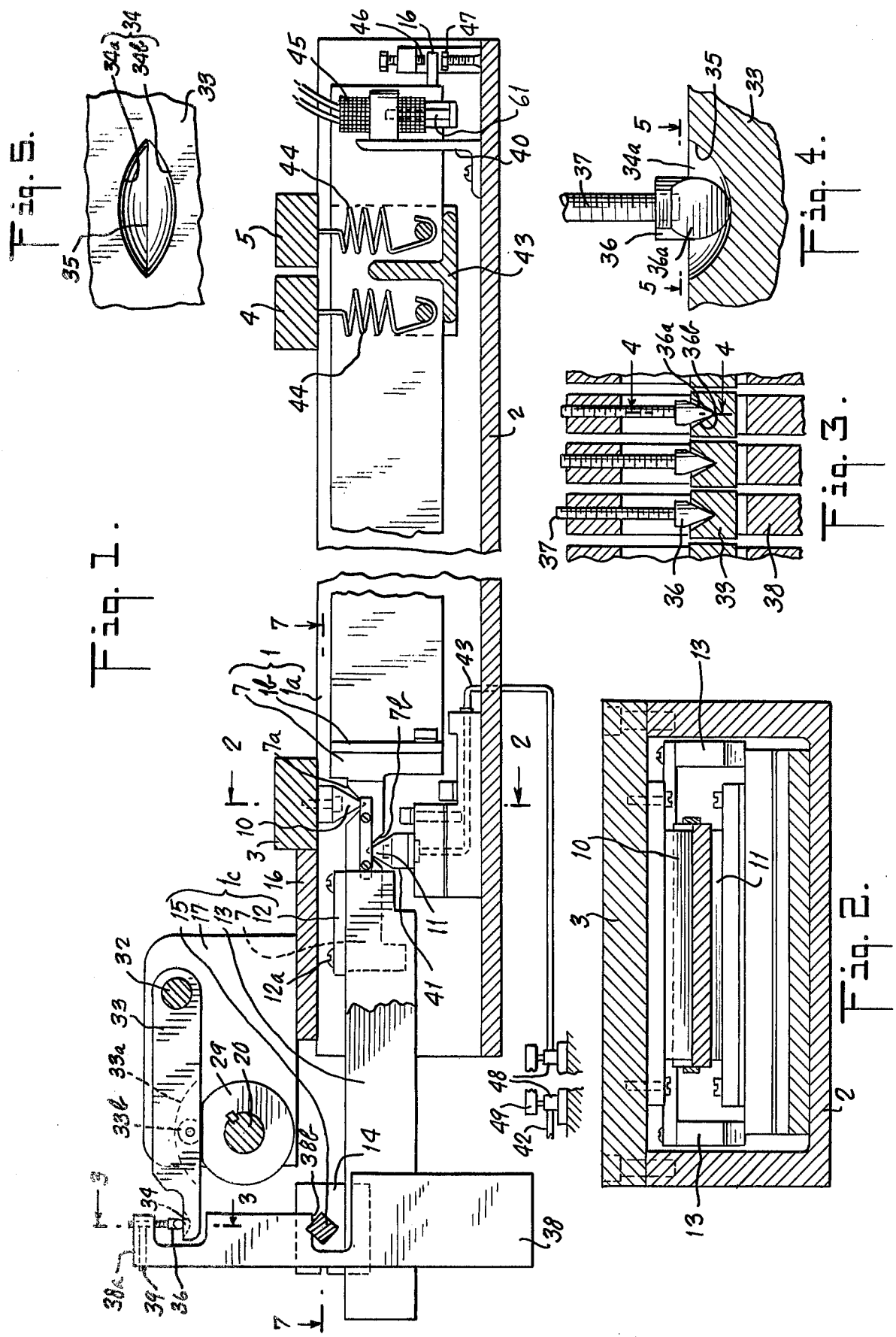

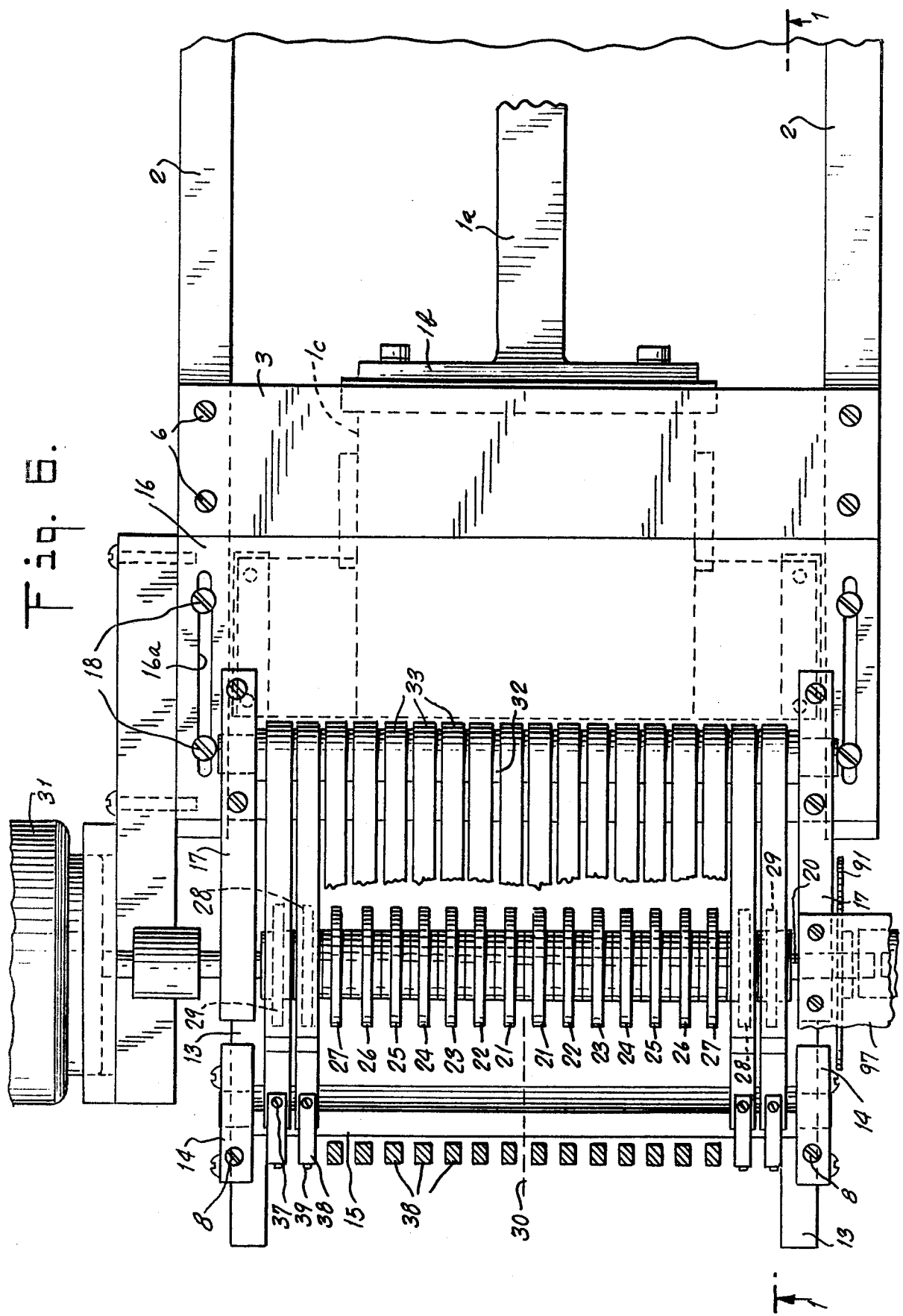

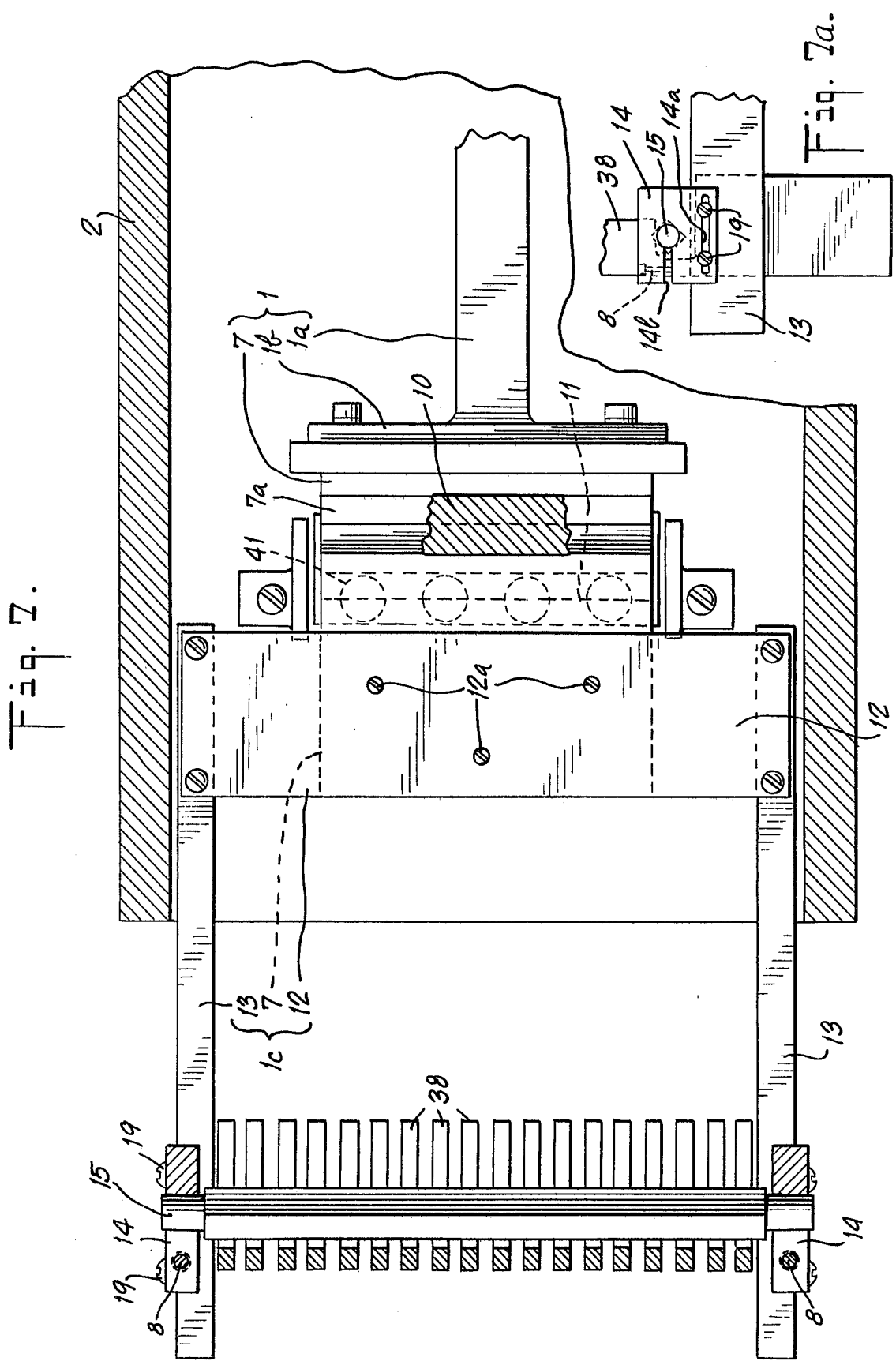

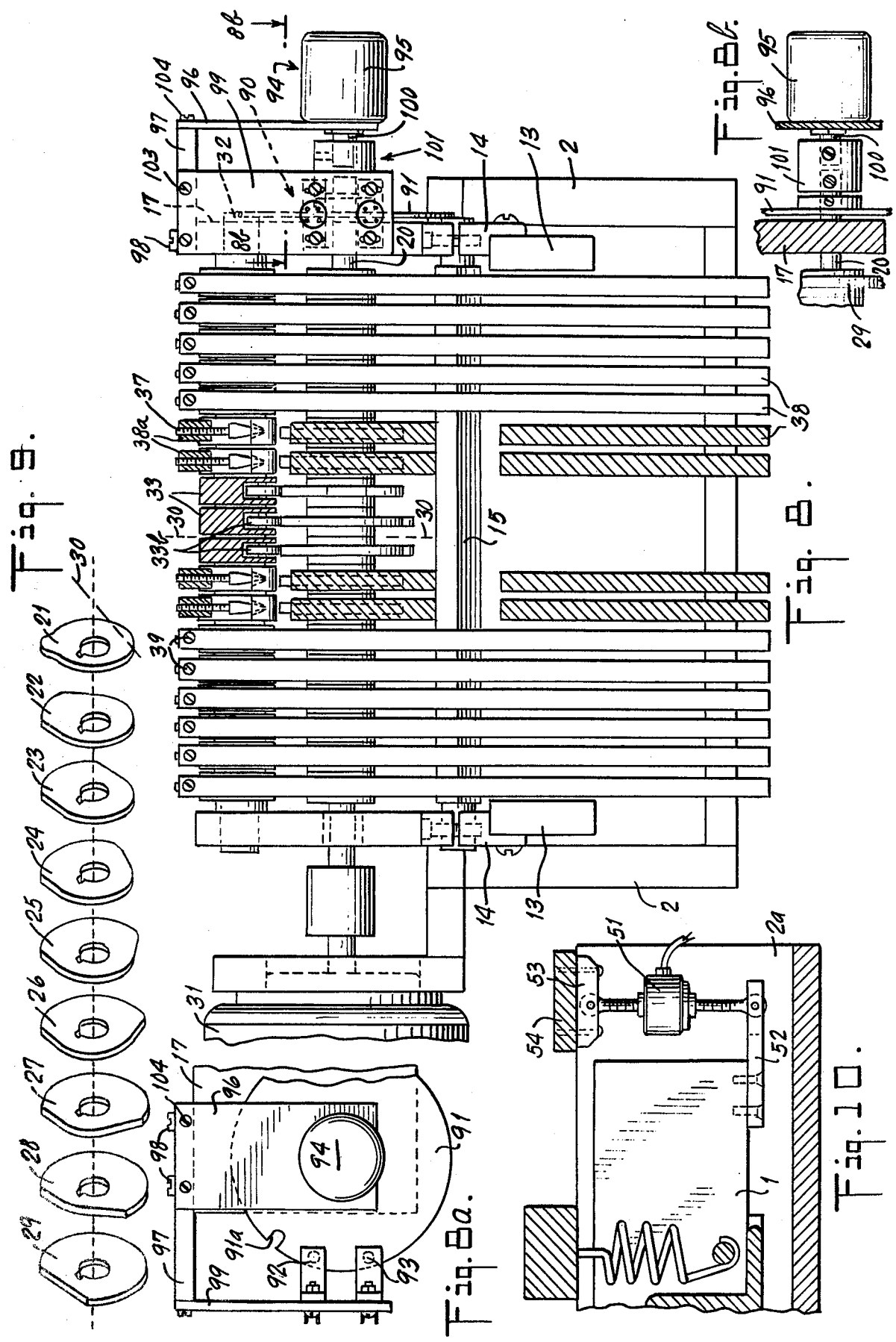

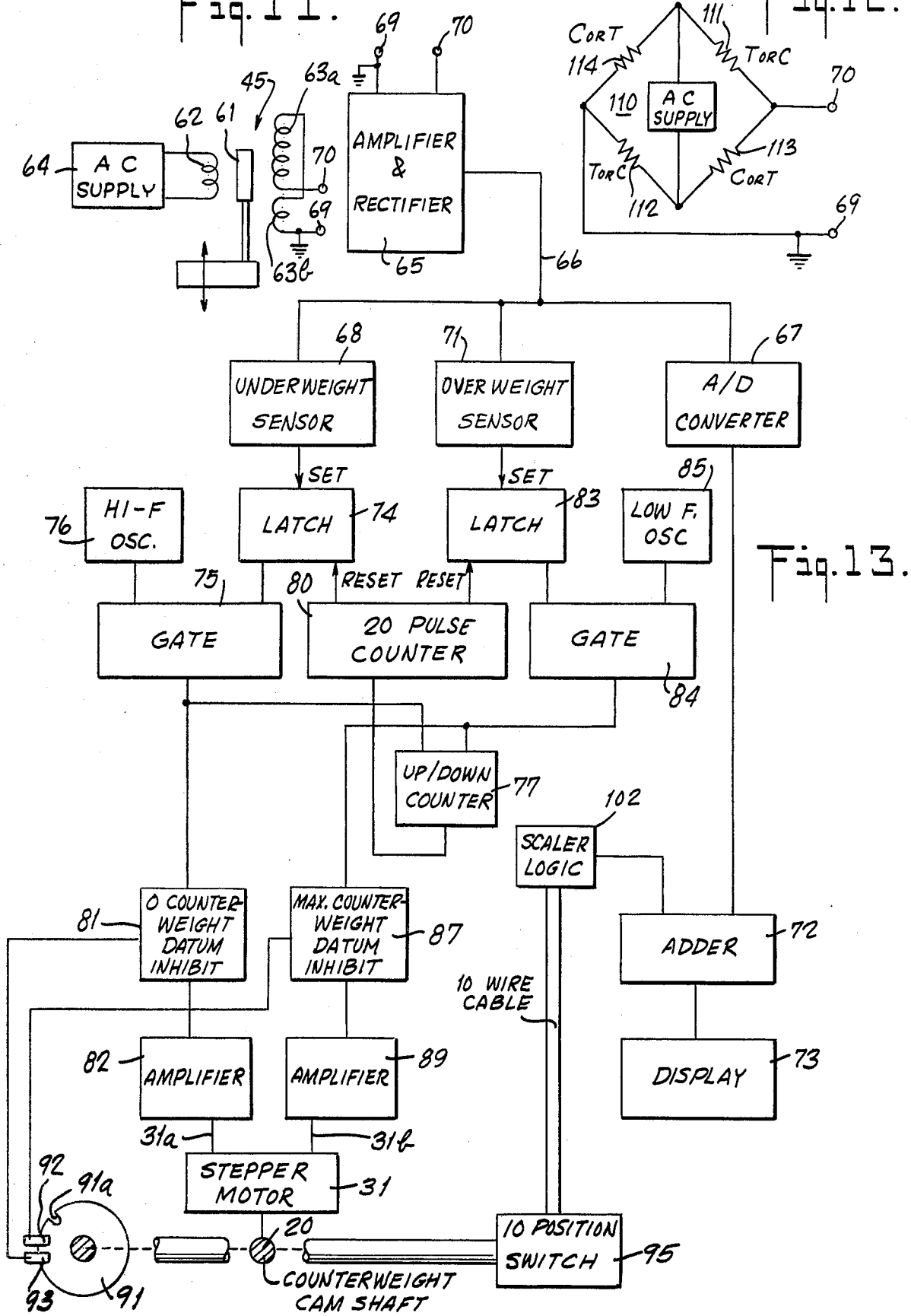

FORCE MEASURING APPARATUS

BRIEF SUMMARY OF THE INVENTION

This invention is an improvement on the apparatus shown and described in the patent to Swersey et al, U.S. Pat. No. 3,791,467. The present invention is particularly directed to means for varying the counterweight applied to the balance beam so as to maintain the beam within a limited range of positions over a wide range of loads. The counterweight operating means also introduces corrections into the output display means to compensate for the change in the counterweights applied to the balance beam.

The counterweight operating means includes a shaft driven by a motor and operating multiple pairs of cams, each driving a follower for depositing a weight on the beam or lifting it off the beam. The cams of each pair are located on opposite sides of the center line of the balance beam, and are at equal distances therefrom, to provide even loading of the beam. Each cam follower includes an arm having a slot on the under side and a roller in the slot cooperating with the cam. The follower arm has on its outer end a groove of V-shaped cross-section having curved side surfaces joining in an arc. Each counterweight is supplied with a shoe at the end of a projecting arm and riding in the groove on the follower. Each counterweight also has a projecting surface with a notch on its under side to fit over a bar which supports the counterweight when it is not carried by the follower. The bar is supported on the balance beam.

The camshaft is driven in steps, each step corresponding to the movement required to add one pair of counterweights to the beam or to lift one pair of counterweights from the beam. The motor is controlled in response to the movements of the beam, being operated when the end of the beam reaches one end or the other of a control range of positions, shorter than and entirely within a wider range of positions which may be established by mechanical stops. When the end of the beam reaches a limit of the control range, the motor is driven in the proper direction to add or remove counterweights from the beam, thereby restoring or tending to restore the beam to the control range. The movements of the beam are translated through a detector which may, for example, be either a linear variable differential transformer or a load cell. The output signal from the detector is determined by the distance of the departure of the beam from a normal position within its control range, and is supplied to an underweight sensor and to an overweight sensor. When this signal exceeds one of the limits corresponding to the ends of the control range, one of the sensors passes pulses from a continuously running oscillator to the motor to drive the camshaft to add or remove counterweights from the beam. The camshaft also operates a ten position switch controlling a scaler logic circuit which produces a digital output indicating the weight represented by the counterweight. The signal from the beam motion detector is also directed to an analog-to-digital converter. The output of the converter and the output of the scaler logic circuit are added in an adder and the output of the adder is transmitted to a display, which indicates the weight supported by the scale.

DRAWINGS

FIG. 1 is a sectional view, taken on the line 1—1 of FIG. 6, showing the balance beam and principal related parts of a weighing apparatus embodying the invention.

FIG. 2 is a cross-sectional view taken on the line 2—2 of FIG. 1.

FIG. 3 is a cross-sectional view taken on the line 3—3 of FIG. 1.

FIG. 4 is a cross-sectional view taken on the line 4—4 of FIG. 3.

FIG. 5 is a plan view taken on the line 5—5 of FIG. 4, with certain parts removed.

FIG. 6 is a fragmentary plan view of the apparatus of FIG. 1, with certain parts broken away and others shown in section.

FIG. 7 is a sectional view taken on the line 7—7 of FIG. 1.

FIG. 7a is a fragmentary elevational view taken at the left end of FIG. 7.

FIG. 8 is a left-hand elevational view of the apparatus of FIGS. 1–7, with certain parts removed, and others shown in section.

FIG. 8a is a fragmentary right-hand elevational view of the apparatus of FIG. 8.

FIG. 8b is a fragmentary sectional view taken along the line 8b—8b of FIG. 8.

FIG. 9 is an exploded perspective view showing one set of cams used in the apparatus.

FIG. 10 is a fragmentary view showing a modification of the apparatus of FIG. 1, using a load cell.

FIG. 11 is a block diagram of the circuitry employed in the linear variable differential transformer of FIG. 1.

FIG. 12 is a block diagram, similar to FIG. 11, showing the circuitry employed in the load cell of FIG. 10.

FIG. 13 is a block diagram of a control circuit for the apparatus, which may have a signal input from either FIG. 11 or FIG. 12.

DETAILED DESCRIPTION

FIGS. 1–9

The weighing apparatus includes a balance beam 1 located in a channel-shaped frame 2. Three crossbars 3, 4 and 5 extend across the top of the frame 2 and are fastened thereto by screws 6.

The balancing beam 1 includes an elongated right-hand section 1a whose left end terminates in a plate 1b, which is bolted to a block 7. The block 7 has a notch 7a in its upper surface for receiving a knife edge 10, and a notch 7b in its under surface for receiving one or more knife edges 11. Knife edge 10 serves as the fulcrum for beam 1. A plate 12 extends across and is attached to the top of the block 7 by screws 12a. The ends of plate 12 project beyond the block 7, as best seen in FIG. 7, and carry a pair of arms 13 which extend to the left from plate 12, as shown in the drawings, and at their ends adjustably support a pair of bearing blocks 14 which support a counterweight holding bar 15 of square cross-section, having one of its corners facing upward. The ends of bar 15 are rounded, and are received in cylindrical apertures in the bearing blocks 14. The blocks 14 are provided with slots 14b (FIG. 7a), each extending from a cylindrical aperture outwardly to an edge of the block. Each block is provided with a clamp screw 8, by which the sides of the slot 14b may be forced toward each other, so that the bar 15 is gripped tightly in its cylindrical aperture, and cannot rotate. The bar 15, arms 13, plate 12, and part of block 7 constitute the left-hand end 1c of beam 1, i.e., the portion to the left of the fulcrum knife edge 10.

The bearing blocks 14 are provided with horizontal slots 14a (FIG. 7a). Screws 19 extend through the slots 14a and are threaded into the arms 13. By loosening the screws 19, the bar 15 may be adjusted lengthwise of the balance beam 1, to provide a calibration adjustment for the counterweights.

A plate 16 (FIG. 6) extends between the sides of frame 2 and is adjustably fastened thereto by means of screws 18 passing through slots 16a and threaded into the frame 2. The plate 16 supports adjacent its ends a pair of bearing blocks 17 in which is journaled a shaft 20, on which are fixed two sets of nine cams each. Each set of cams is numbered 21-29. Each pair of cams bearing the same number are located at the same distance from and on opposite sides of the center line 30 of the balance beam. Adjustment of the plate 16 lengthwise of the frame 2 may be made by screws 18 to follow any calibration adjustment of the counterweight bar 15, made by means of screws 19.

The shaft 20 is driven by a motor 31 controlled by apparatus disclosed in detail below in connection with FIG. 13.

The shaft 20 drives a limit control generally indicated at 90 (FIGS. 8 and 8a) and a shaft position sensor generally indicated at 94. The limit control 90 includes a circular opaque disc 91 fixed on the cam shaft 20 and having a notch 91a in its periphery. The disc 91 cooperates with two peripherally spaced limit position sensors 92 and 93, each comprising a radiant energy source and a suitable detector of that energy. The sensors 92 and 93 are mounted on a plate 99, supported on another plate 97 by means of screws 103. Plate 97 is supported on one of the bearing blocks 17 by means of screws 98. The notch 91a moves between the source and the detector of sensor 92 at one limiting position of the shaft 20, (the counterclockwise limiting position as viewed in FIG. 8a), hereinafter referred to as the zero pulse datum position. The notch 91a moves between the source and detector of sensor 93 at the other limiting position (the clockwise limiting position as viewed in FIG. 8a), hereinafter referred to as the 180 pulse datum position.

The position encoder 94 includes a 10 position switch 95 mounted on the plate 96 which is fixed on plate 97 by means of screws 104. The switch 95 is operated by a shaft 100 connected by a coupler 101 to the end of shaft 20. The switch 95 has eleven terminals (not shown), one of which is connected to a source of electrical energy and the other ten are connected by separate conductors which may be cabled together to a scaler logic circuit 102, shown diagrammatically in FIG. 13. An electrical output on one of these ten conductors uniquely indicates one of the ten positions of the camshaft 20, and thereby indicates the number of counterweights resting on the bar 15, as determined by the angular position of that shaft. The scaler logic circuit 102 produces an output, which may be in the binary coded decimal form, indicating the numerical weight equivalent of the counterweights resting on the bar 15.

Mounted on the bearing blocks 17 is another shaft 32, on which are rotatably mounted a set of 18 follower arms 33. Each follower arm has a recess 33a (FIG. 1) in its under side, facing one of the cams 21-29. A roller 33b is rotatably mounted on the arm within the recess, and engages the adjacent cam 21-29. The end of each follower arm 33 projects beyond the cams 21-29 and is provided in the upper surface of its outer end with a groove 34 shown in detail in FIG. 5. The groove 34 comprises two spherical surfaces 34a, 34b, having a radius of curvature longer than the width of the groove 34. The two spherical surfaces 34a, 34b join at an arc 35. The groove 34 receives a shoe 36 (FIG. 4) rotatably mounted on the end of a threaded rod 37, which is adjustably threaded into an arm 38a projecting from the upper end of a counterweight 38. A set screw 39 holds the rod 37 in any adjusted position in the arm 38a. The counterweight 38 is provided with a projecting, downwardly facing surface 38b (FIG. 1), below the projecting arm 38a. The projecting surface 38b is notched to receive the upwardly projecting corner of the counterweight holding bar 15.

The shoe 36, (best seen in FIG. 4), has a generally cylindrical shank, and, at its lower end, two plane surfaces 36a, 36b on opposite sides of the shoe, form a wedge. The end of the wedge has a rounded profile with a radius smaller than that of the arc 35. The tip of the wedge is about 0.005 inch wide, so that it makes point contacts with both the spherical surfaces 34a, 34b. The wedge tapers gradually from the shank to the tip.

When a follower arm 33 is lifted by its associated cam 21-29, the groove 34 on the arm 33 engages the shoe 36 and the arm 33 lifts the counterweight 38 so that it no longer rests on the bar 15. When a follower 33 is lowered by one of the cams 21-29, the counterweight comes to rest on the bar 15 and the groove 34 moves downwardly away from the shoe 36. The curved surface at the end of the shoe 36 allows the counterweight to pivot slightly when it is supported by the follower arm, so that no lateral force can be applied to the counterweight by the follower arm, but only a lifting force. When the counterweight 38 is supported by engagement of the shoe 36 with the groove 34, the only stable position of the counterweight is that in which the lowermost tip of the shoe 36 engages the groove 34. If the counterweight swings from that position, a wider portion of the surface of the wedge engages the surfaces 34a, 34b and lifts the counterweight slightly, so that the weight of the counterweight tends to restore the counterweight to its lower, stable position, in which the narrowest part of the tip engages the surfaces 34a, 34b.

The force being measured is supplied to the balance beam 1 by four hydraulic load cells 41, (FIGS. 1 and 7) receiving liquid under pressure through connections 42 and 43, which extend to load cells 48 located under the corners of a platform 49 (48 and 49 are shown on a reduced scale in FIG. 1) for receiving a load to be weighed. Each load cell 41 forces a knife edge 11 upwardly against notch 7b in the block 7 (FIG. 1). The load cells 41 and the block 7 act as a totalizer for the load on platform 49.

The right-hand end of the balance beam 1 carries a cross-bar 43 to which are attached tare springs 44 connected to the fixed crossbars 4 and 5. Any convenient number of tare springs may be used. These connections are preferably made by adjustable means, well known in the art, so that the tare force on the balance beam may be adjusted.

The right-hand end of the balance beam also carries an armature 61 of a linear variable differential transformer, generally shown at 45, which produces an alternating output signal varying in amplitude with the distance by which the balance beam departs from a predetermined datum position. The signal has one phase or the opposite phase, depending on the direction of departure of the beam from the datum position. The windings of transformer 45 are supported by a bracket 40 mounted on the base 2. A projection 16 on the end of the balance beam 1 moves between a pair of adjustable stops 46 and 47, by which the range of movement of the right-hand end of the balance beam is mechanically limited.

The fulcrum of the beam is the knife edge 10, engaging the upper surface of the beam, in contrast to the more conventional location, engaging the under surface of the beam. The hydraulic force applied by load cells 41 and the force of the tare springs 44 support the beam and hold it against the fulcrum knife edge 10.

The cams 21–29 have contours which are stepped in sequence, as best seen in FIG. 9, which shows in perspective the nine cams appearing on one side of the center line 30, as viewed in FIG. 6. When the cams are in the positions shown in FIG. 9, all the followers 33 are raised, and all the counterweights 38 are lifted from the bar 15. This is the normal position of the counterweights when there is no load on the platform 49. As the cams rotate counterclockwise, as viewed from the right in FIG. 9, the cam 21 first lowers its counterweight 38 onto the bar 15. That counterweight remains there during the continued travel of the cams in that direction. The maximum travel in that direction is less than one complete rotation. If the shaft continues to move in that direction, the cams 22, 23, 24, etc., add their counterweights to the bar 15 in sequence. As long as the motion of the shaft does not reverse, any weight added to the bar remains there. It may be seen that the counterweights are added or removed in fixed steps, each step being less than the total variation in the load indicated by the range of travel of the balance beam 1.

The shaft 20 carrying the cams extends transversely of the beam, on both sides of the beam center line 30. The cams are arranged in pairs of the same contour. The cams of each pair are located on opposite sides of the center line at equal distances therefrom. As the shaft 20 rotates, the cams operate their counterweights simultaneously and in the same sense. Consequently, the cams are effective as the shaft rotates to add or remove equal counterweights from the bar simultaneously on both sides of the center line, thereby avoiding unequal torsional loading of the balance beam 1 with respect to that center line.

FIG. 10

This figure illustrates a modification of the weighing apparatus shown in FIGS. 1–9, in which the linear variable differential transformer 45 is replaced by a strain gage load cell 51 of the universal type (i.e., responding to either compression or tension forces). Load cell 51 is connected between an extension 52 on the end of the balance beam 1 and a support plate 53, fixed to a crossbar 54 mounted on the side frame member 2a. The load cell 51 may be of the type shown in the patent to Jacobson, U.S. Pat. No. 3,315,203.

The operation of the weighing apparatus in FIG. 10 is similar to that of the apparatus of FIGS. 1–9, except that the range of movement of the balance beam 10 is considerably reduced, being just sufficient to stress the load cell 51 between limits which have been previously determined.

FIG. 11

The position of the armature 61 of variable differential transformer 45 determines the coupling between a primary winding 62 and a pair of secondary windings 63 connected in series opposition between a grounded output terminal 69 and another terminal 70. The primary winding 62 is connected to a suitable alternating current supply source 64. As mentioned above, the transformer 45 produces an output signal when the balance beam departs from a median zero position. The phase of the signal varies with the direction of the departure and the amplitude varies with the distance.

FIG. 12

This figure illustrates, in a simplified diagrammatic form, a typical load cell circuit which may be used with the load cell of FIG. 10 in place of the variable differential transformer of FIG. 11 to supply an input for the input terminals 69 and 70 of the motor control and display circuits shown in FIG. 13.

Referring to FIG. 12, the AC supply 64, which may be the same AC supply mentioned in connection with FIG. 11, is connected to two terminals of a bridge circuit generally indicated at 110. The bridge circuit 110 includes two strain gage resistance elements 111 and 112 in opposite arms of the bridge and two strain gage resistance elements 113 and 114 in the other two opposite arms. The output terminals of the bridge are connected to the input terminals 69 and 70 of the motor control and display circuits. The strain gage elements 111 and 112 are stressed in one sense by a movement of the beam in a given direction and the strain gage elements 113 and 114 are stressed in the opposite sense. In other words, if the beam moves to stress the cells 111 and 112 in tension, then the strain gages 113 and 114 are stressed in compression, and vice versa.

As in the case of FIG. 11, the bridge circuit 110 produces an output signal when the balance beam departs from its zero position. The phase of the signal is determined by the direction of the departure, being one phase or the opposite phase. The amplitude of the signal varies with the distance of the departure.

Instead of energizing the bridge circuit with alternating current, direct current may be used, providing appropriate changes are made in the circuit of FIG. 13.

FIG. 13

This figure illustrates a circuit for controlling the motor 31 and a digital output display 73. The terminals 69 and 70 are connected to an amplifier and demodulator circuit 65 which produces a DC output signal on a line 66 connected to an analog-to-digital converter 67, an underweight sensor 68 and an overweight sensor 71. The DC signal varies in polarity with the direction of the departure of the beam from its zero position, and varies in magnitude with the distance of that departure.

The converter 67 produces a digital output signal corresponding to the analog input signal and transmits that digital signal to one input of an adder 72 having an output connected to a suitable digital display 73. When the analog signal at line 66 indicates that the right-hand end of the balance beam has reached the high end of its control range of positions (too much counterweight), then the underweight sensor 68, which is a suitable conventional analog comparator, sets a latch 74 which opens a gate 75 between a high frequency oscillator 76 and an up/down counter 77.

The oscillator 76 produces pulses at a predetermined rate, for example, 20 per second. Its frequency is high only as compared to that of a low frequency oscillator described below. The output of the counter 77 is transmitted to a twenty pulse counter 80 which, after receiving 20 pulses, drives a reset input of the latch 74. Consequently, when the latch 74 is set, it transmits pulses from the high frequency oscillator to the up/down counter until 20 pulses have been transmitted and then transmits a reset pulse to the latch 74. If the set signal from the sensor 68 has terminated, this reset pulse closes the gate and turns off the supply of pulses through the gate.

The pulses from the output of gate 75 also pass through an inhibit logic circuit 81 to an amplifier 82 and thence to one input 31a of the stepper motor 31. The motor 31 is constructed so that pulses received at input 31a cause it to rotate in a direction to remove counterweights from the balance beam. Operation of shaft 20 actuates the switch 95 and thereby the scaler logic circuit 102 to supply a signal to adder 72 and thence to display 73, to reflect the weight represented by the removed counterweight. The stepper motor may, for example, require two hundred pulses to complete one revolution of the cam shaft 20. Nine cam contours are employed, and the cams are contoured to remove or add one pair of counterweights when the cam shaft turns through an angle produced by 20 pulses. Since there are nine pairs of cams, a total of 180 pulses will drive the motor from one end to the other of the normal range of travel of shaft 20, leaving a gap of 20 pulses between the ends of its range of travel, which is thus less than one revolution.

In a similar fashion, when the signal on line 66 indicates that the balance beam has reached the low end of its control range of positions (too little counterweight), the overweight sensor 71 sets a latch 83 which opens a gate 84 and transmits pulses from a low frequency oscillator 85 through the gate to a terminal of the up/down counter 77 and an inhibit logic circuit 87 which is connected to another amplifier 89 and which supplies another input 31b of the stepper motor 31, to drive it in a direction to add counterweights to the beam.

After 20 pulses have been counted by the 20 pulse sensor 80, that sensor resets the latch 83 (providing the set signal from sensor 71 has terminated) and turns off the supply of pulses from oscillator 85. Consequently, when the signal on the line 66 indicates that the balance beam is moved to the end of its control range in the counterweight increasing direction, then the pulses from the source 85 are transmitted to the up/down counter. At the same time, the pulses are effective to drive the motor 31 in a direction to add counterweights to the balance beam, and to operate the switch 95 and circuit 102 so that the display 73 may reflect the weight represented by the added counterweight.

It is necessary, for accuracy of weight measurement, to maintain contact between the balance beam and the knife edge at all times. When the load on the platform 49 is decreasing, the right-hand end of the beam may move against the stop 46 and stay there. The counterweight must therefore be removed rapidly in order that the counterweight load on the balance beam 1 does not remain so high that it carries the balance beam down, away from the knife edge 10. When the load on platform 49 is increasing, the balance beam, even though it may not be even approximately balanced by the counterweight, is forced by the knife edge 11 against the knife edge 10. Consequently, a slower speed of response may be used when adding counterweights than when removing counterweights. For this reason the motor 31 is driven at 20 pulses per second when counterweights are being removed and at only three pulses per second when counterweights are being added.

When the load on the platform 49 is changing faster than the counterweights can be added or removed by the operation of the motor 31, then the underweight or overweight sensor 68 or 71, whichever happens to be operating, continues to transmit a set signal to latch 74 or 83 as long as the overweight or underweight condition persists. Consequently, the reset pulses from the 20 pulse sensor 80 are ineffective to reset the latch, which continues to hold the gate 75 or 84 open, and the motor 31 continues to run and add or remove counterweights as required until the balance beam is restored to its control range of positions.

When the cam shaft 20 reaches one end or the other of its range of travel, then one of the limit position sensors is activated when the notch 91a in the periphery of disc 91 becomes aligned with one of the sensors 92 or 93. That sensor is then effective to transmit the signal to one of the datum inhibit circuits 81 and 87, which block the further transmission of drive pulses in one direction to the motor 31. More specifically, if the motor is running in the counterweight decreasing direction, then the sensor 93 becomes effective to activate the inhibit circuit 81 to block the further transmission of pulses to the motor 31 in the counterweight decreasing direction. On the other hand, when the shaft 20 reaches the end of its travel in the counterweight increasing direction, the sensor 92 becomes aligned with the notch 91a and transmits an activating signal to the datum inhibit circuit 87 to block further pulses from the motor 31 in the counterweight increasing direction. Thus, the shaft 20 is limited to a range of travel of less than one complete revolution. The limit in the clockwise direction, as viewed in FIGS. 8a and 13 is determined by the sensor 93, whereas the limit in the counterclockwise direction is determined by the sensor 92.

We claim:
1. Force measuring apparatus, comprising:
   a. a balance beam (1);
   b. means (49,48,43,41) for applying a force to be measured to the balance beam;
   c. counterweight means (38) operable to apply a balancing force to the balance beam in opposition to the force to be measured;
   d. means (20, 21–29,33) for operating the counterweight means to vary the force thereof;
   e. means (45 or 51,67,72) responsive to the position of the beam within a predetermined control range for producing a first digital signal representative of the load indicated by that position;
   f. means (68,75,81,82; 71,84,87,89; and 31) responsive to movement of the beam to a limit of that range for driving the counterweight operating means in a sense tending to restore the beam to a position within that range;
   g. means (95,102) actuated concurrently with the counterweight operating means for producing a second digital signal representative of the increment of force due to a change in the counterweight means;
   h. means (72) for adding said first and second digital signals; and
   i. display means (73) for indicating the output of the adding means.
2. Force measuring apparatus as in claim 1, including:

a. means (45,63,65) in said position responsive means to produce an analog signal indicative of that position;
b. an analog-to-digital converter (67) in said position responsive means for converting said analog signal into said first digital signal;
c. range limit sensor means (68,71) connected to said analog signal producing means and effective to produce an output signal when said range limit is exceeded;
d. a source (76,85) of periodic pulses;
e. a gate (75,84) connected to the output of said source and having an enabling input connected to the output of said range limit sensor means; and
f. said driving means including a motor (31) responsive to pulses passing through said gate, said motor driving both said means for operating the counterweight means and said means for producing the second digital signal.

3. Force measuring apparatus as in claim 2, including:
a. a latch (74 or 83) set by said range limit sensor, having an output effective when the latch is set to enable said gate and a reset input; and
b. a resetting counter (77,80) having an input connected to the output of the gate and having an output connected to said reset input to supply a reset signal to the latch after said gate has produced a number of output pulses equivalent to one step of said counterweight force varying means.

4. Force measuring apparatus as in claim 3, including:
a. maximum and minimum range limit sensors (68 and 71);
b. two latches (74,83), one for each of said sensors;
c. two gates (75,84), one for each of said latches; and
d. one resetting counter (77,80), operable to transmit a resetting signal to both latches.

5. Force measuring apparatus as in claim 4, including:
a. a stepping motor (31) to drive said force varying means through a fixed range of travel;
b. limit control means (92,93) actuated by the motor when the force varying means reaches either end of its range of travel;
c. circuit means (76,75,81,82,31a and 85,84,87,90,31b) for driving the motor; and
d. inhibit logic means (81,87) controlled by said limit control means and connected in said circuit means, so that said motor cannot drive said force varying means beyond said fixed range.

6. Force measuring apparatus as in claim 1, in which said counterweight force varying means comprises:
a. a shaft (20);
b. a plurality of cams (21-29) on said shaft;
c. a plurality of followers (33), one for each cam;
d. a plurality of counterweights (38), one operated by each follower;
e. a weight holding bar (15) on the beam;
f. said cams being contoured to sequentially deposit the counterweights on the bar as the shaft is rotated in one direction and to sequentially lift the weights off the bar as the shaft is rotated in the opposite direction;
g. said shaft extending transversely of the beam on both sides of the beam center line (30);
h. said cams and counterweights being arranged in pairs (21,21, 22,22 etc.), with the cams of each pair on opposite sides of the center line at equal distances therefrom, the cams of each pair being similarly contoured to operate their counterweights simultaneously and in the same sense;
i. said shaft and cams being effective as the shaft rotates to add or remove equal counterweights from the bar on both sides of the center line simultaneously.

7. Force measuring apparatus as in claim 1, in which said counterweight force varying means comprises:
a. a shaft (20);
b. a cam (21-29) fixed on the shaft for rotation therewith;
c. a follower comprising an arm (33) driven by the cam;
d. means (21-29,33,34,36) including said cam and follower to lift said counterweight means off the balance beam or to place it on the balance beam as the shaft is rotated;
e. said counterweight means including:
  1. an upper arm (38a) projecting over said follower arm;
  2. a shoe (36) at the end of said upper arm projecting downwardly therefrom and riding in a groove (34) on the follower arm;
  3. a lower projecting surface (38b) having a notch in its under surface; and
f. a bar (15) supported on said balance beam and interfitting with said notch to receive and support said counterweight means.

8. Force measuring apparatus as in claim 7, in which:
a. said shoe has a vertical peripheral surface and symmetrical plane surface (36a) intersecting said vertical surface and defining a wedge at the lower end of the shoe;
b. said groove (34) in the follower arm having intersecting spherical side surfaces (34a, 34b) and being wider than the shoe so that the wedge tip rides on the arc defined by the intersection of the spherical surfaces.

9. Force measuring apparatus as in claim 7, including means (14,14a,19) for moving said counterweight supporting bar lengthwise of the balance beam.

10. Force measuring apparatus as in claim 1, including:
a. a fulcrum (10) located above the beam and engaging an upper surface thereof;
b. said means for applying a force to be measured comprising hydraulic load cell means (42) below the beam to apply an upward force thereto;
c. cam means (21-29) for depositing said counterweight means on the beam to increase the force thereof on the balance beam;
d. said means for driving the counterweight operating means including:
  1. a motor;
  2. means (85,84) for operating the motor at a relatively slow speed in a direction to increase the force of the counterweight means; and
  3. means (76,75) for operating the motor at a relatively fast speed to decrease the force of the counterweight means, so as to prevent separation of the beam from the fulcrum when the load is relieved.

11. Force measuring apparatus as in claim 10, in which said driving means includes:
a. a motor (31);
b. two sources (85,76) of periodic pulses, one (85) operating at a lower frequency and theother (76) at a higher frequency; and
c. means (84,87,90 and 75,81,82) for energizing said motor in accordance with pulses from said lower frequency source to increase the force of the counterweight and to drive the motor in accordance with pulses from the higher frequency source to decrease the force of the counterweight.

* * * * *